(12) United States Patent
Halterman

(10) Patent No.: US 10,435,315 B2
(45) Date of Patent: Oct. 8, 2019

(54) MODULAR MANIFOLD FOR AN ELECTROLYZED WATER PROCESSOR

(71) Applicant: CASCADE RIDGE INDUSTRIES, LLC., Quincy, WA (US)

(72) Inventor: Carl Halterman, East Wenatchee, WA (US)

(73) Assignee: Cascade Ridge Industries, LLC., Quincy, WA (US)

( * ) Notice: Subject to any disclaimer, the term of this patent is extended or adjusted under 35 U.S.C. 154(b) by 0 days.

(21) Appl. No.: 15/284,325

(22) Filed: Oct. 3, 2016

(65) Prior Publication Data

US 2018/0050934 A1 Feb. 22, 2018

Related U.S. Application Data

(62) Division of application No. 13/748,533, filed on Jan. 23, 2013, now Pat. No. 9,458,036.

(51) Int. Cl.
| | |
|---|---|
| *C25B 9/08* | (2006.01) |
| *C25B 1/10* | (2006.01) |
| *C25B 9/00* | (2006.01) |
| *C25B 9/06* | (2006.01) |
| *C25B 9/18* | (2006.01) |
| *C02F 1/461* | (2006.01) |

(52) U.S. Cl.
CPC ........ *C02F 1/4618* (2013.01); *C02F 1/46104* (2013.01); *C02F 2201/007* (2013.01); *C02F 2201/4617* (2013.01); *C02F 2201/46115* (2013.01)

(58) Field of Classification Search
CPC .... C25B 9/08; C25B 1/10; C25B 9/00; C25B 9/06; C25B 9/18; C25B 9/02; C25C 7/02; C25C 3/08; C25C 7/00
USPC ....................................................... 204/242
See application file for complete search history.

*Primary Examiner* — Zulmariam Mendez
(74) *Attorney, Agent, or Firm* — Svendsen Legal, LLC.

(57) ABSTRACT

An electrolyzed water processor chamber with an anodic chamber having an anode plate held in an anode tray, and a cathodic chamber having a cathode plate held within a cathode tray. The plates are charged by an electrical current, to separate an incoming water stream into its electromagnetically ionized alkaline and acidic components, across an ion exchange membrane sandwiched between the anode and cathode plate trays. The trays can include sets of ducts and cavities, so that when the trays are stacked together, with the cavities aligning to form plenums for the routing of water between the trays. The trays stack as modular units, so that any multiple of the anodic and cathodic tray pairs, with their plates and sandwiched membrane, can be stacked together and function as a combined processor chamber, with end caps mounted on the top-most and bottom-most plate trays.

8 Claims, 4 Drawing Sheets

MODULAR MANIFOLD FOR AN ELECTROLYZED WATER PROCESSOR

TECHNICAL FIELD

An improved system of manifold plates for an electrolyzed water processor, specially suited to the separation of an initial water stream into its electromagnetically ionized components. More specifically, a set of modular manifold trays for use in an apparatus, to derive and direct streams of alkaline water and acidic water from the initial water stream, with a steady-state processing of the initial water stream, through an electrically charged set of plates or electrodes.

BACKGROUND OF THE INVENTION

Conventional electrolyzed water processors separate the electrolytes naturally found within water with the aid of charged electrodes; one having an eclectically positive charge and one having an eclectically negative charge, to achieve a magnetic separation or 'electrolysis' of a processed water stream. This type of electrolysis occurs in a chamber of some sort, which provides for the separation of the incoming water stream into cathodically charged and anodically charged product streams. In this electromagnetic processing of incoming water, hydroxide ions are produced within the chamber and "cations" or positively charged ions are attracted to the cathode, leading to an alkaline solution that includes sodium hydroxide. Within the chamber, "anions" or negatively charged ions are attracted to the anode. Chloride ions within the water are oxidized to elemental chlorine. If this chlorine is allowed to combine within the chamber to some of the hydroxide ions produced by the cathodic reactions, hypochlorous acid forms, which is a weak acid and an oxidizing agent.

Several difficulties arise in prior configurations and designs of electrolyzed water processors, and especially with the reaction chamber employed for the electrolyzing process. Precise and consistent product streams are needed for the effective use of electrolyzed water in home and industrial environments. The present invention provides an efficient reaction chamber that is easily maintained and uniquely modular in construction, and which produces precise and consistent product streams, when used in an electrolyzed water processor system.

The following is a disclosure of the present invention that will be understood by reference to the following detailed description taken in conjunction with the accompanying drawings.

Figure 1:
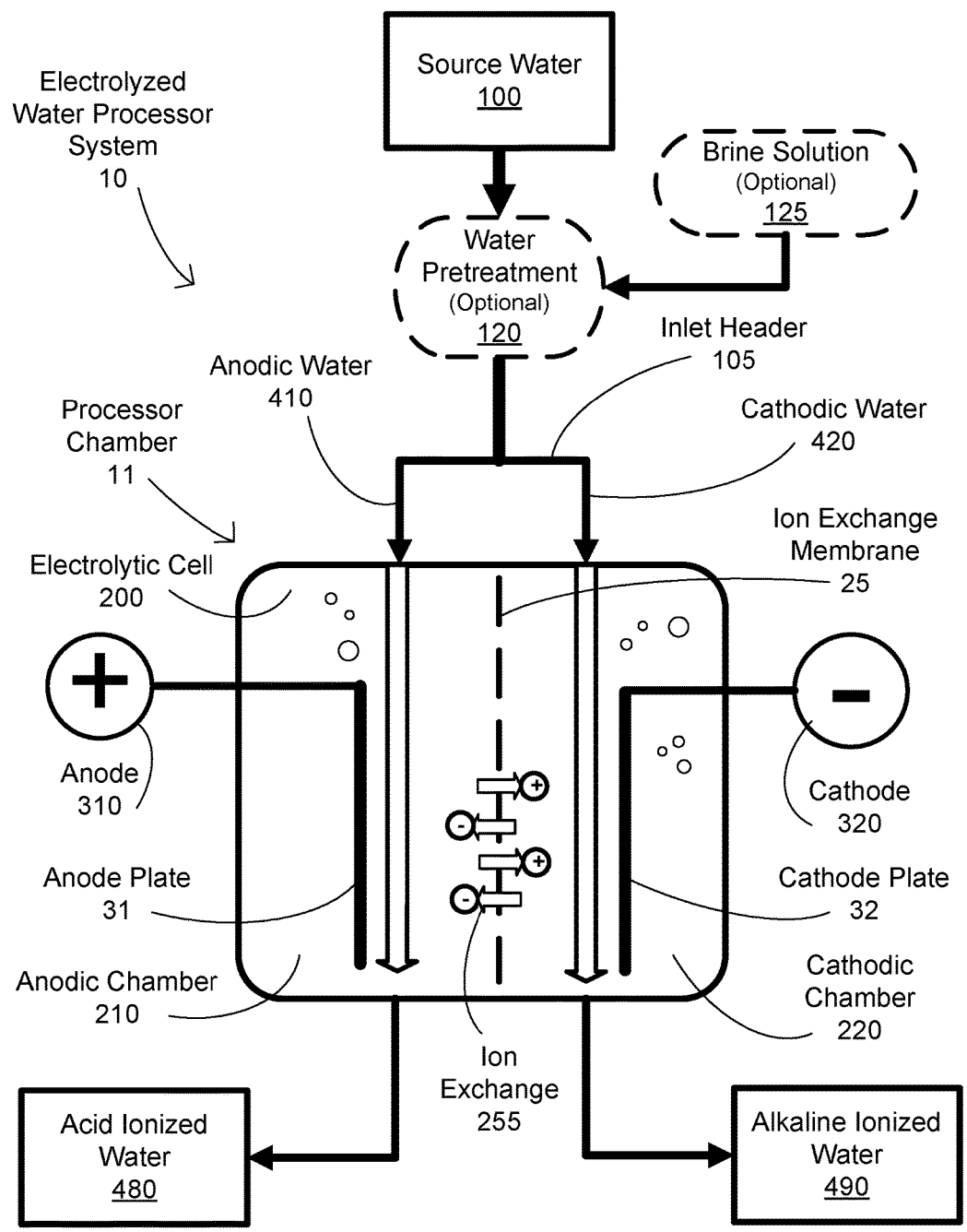
FIG. 1 is a schematic view of an electrolyzed water processor, as disclosed in the prior art.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and that the embodiments are sometimes illustrated by fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The present invention provides a modular manifold for an electrolyzed water processor, with FIGS. 2 through 5 showing preferred embodiments of electrolysis chambers and having features according the present invention, and with FIG. 1 schematically illustrating the operation of a conventional electrolyzed water processor.

Generally, as shown in FIG. 1, an Electrolyzed Water Processor System 10 converts a Source Water 100 into an Acid Ionized Water 480 and an Alkaline Ionized Water 490, employing an Electrolytic Cell 200. Optionally, a Water Pretreatment 120 can be employed prior to processing in the Electrolytic Cell. The Water Pretreatment stage is useful to purify or filter the Source Water, if necessary or desired, and more importantly, to maintain an adequate and consistent level of ions in the Source Water. Preferably, for use with the present invention employing ordinary tap water or well water as the Source Water, the Water Pretreatment includes the metered addition of an approximate 1% weight-to-volume of a salt and water Brine Solution 125, to achieve a steady ion concentration.

The terms "approximately" or "approximate" are employed herein throughout, including this detailed description and the attached claims, with the understanding that is denotes a level of exactitude commensurate with the skill and precision common within the particular field of endeavor, as applicable.

Preferably, the Source Water 100 is split into two equal streams at an Inlet Header 205, or suitable piping that functions to split the Source Water fed into the Electrolytic Cell 200. The Electrolytic Chamber includes an Anodic Chamber 210 and a Cathodic chamber 220, separated from each other by an Ion Exchange Membrane 250.

The Anodic Chamber 210 includes an Anode 310, and the Cathodic Chamber 220 includes a Cathode 320. The Anode and the Cathode are charged by a direct electrical current (DC) of a constant voltage and amperage, which can be regulated as needed to achieve a desired ionization of the Source Water 100 within the respective chambers of the Electrolytic Cell 200. The Anode and the Cathode can be connected to a common battery, a DC generator, or to an AC-to-DC rectifier, preferably with the aid of conventional copper connections and busses.

Figure 2:
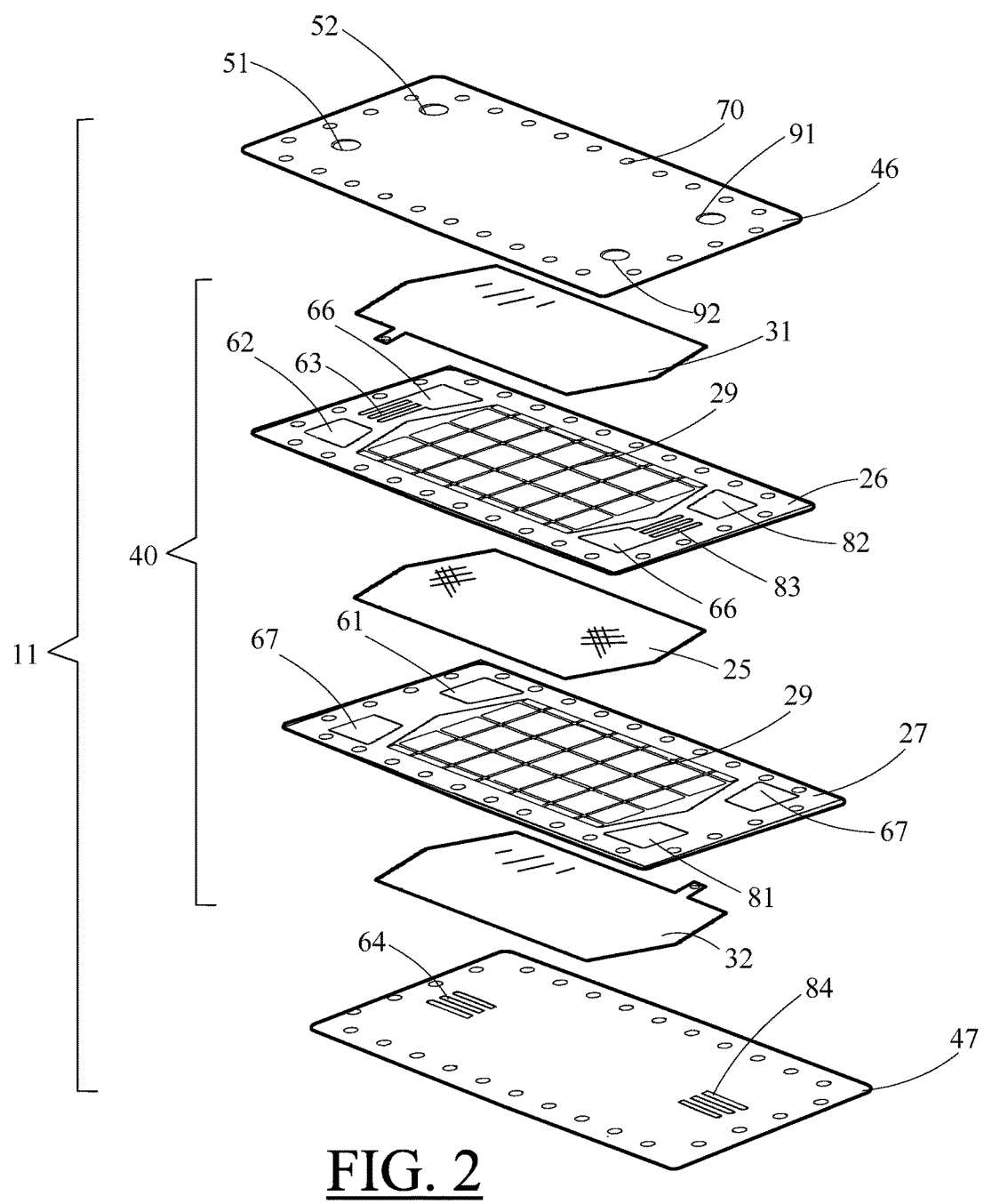
FIG. 2 is an exploded perspective view of an electrolyzed water processor chamber having a modular manifold, according to an embodiment of the invention.
Figure 3:
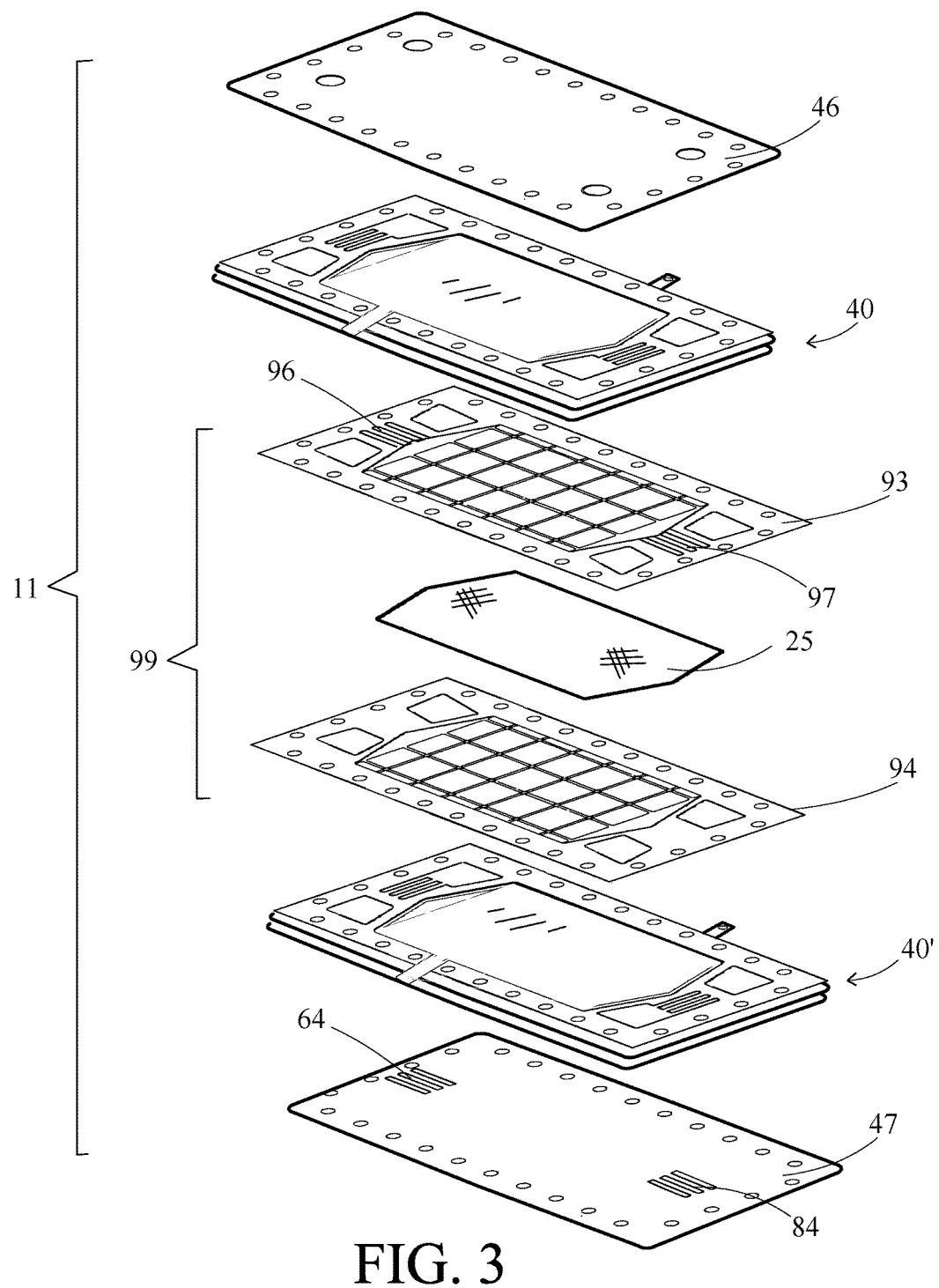
FIG. 3 is a partially an exploded perspective view of an electrolyzed water processor chamber having a modular manifold, according to an embodiment of the invention.

As shown in FIGS. 2 and 3, preferred alternative embodiments of the electrolyzed water Processor Chamber 11 according to the present invention include the Electrolytic Cell 200 with an Ion Exchange Membrane 25 sandwiched between an Anode Plate Tray 26 and a Cathode Plate Tray 27. Most preferably, the Anode Plate Tray and the Cathode Plate Tray are interchangeable, and simply flipped relative to each other, to impart the desired water flow routing through the assembled modular tray system. As shown in FIG. 2, a plate is received into each plate tray, with an Anode Plate 31 received into the Anode Plate Tray and a Cathode Plate 32 received into the Cathode Plate Tray. The Ion Exchange Membrane is placed between the Anode Plate Tray and the Cathode Plate Tray, with the Anode Plate and the Cathode Plate received on the opposite side of the respective trays, relative to the Ion Exchange Membrane, as shown in FIG. 2. Each tray includes a Tray Grid 29, to maintain a separation between the individual plates and the membrane, avoiding contact between them. A Cell Module 40 is formed by the assembled Anode Plate within the Anode Plate Tray and Cathode Plate within the Cathode Plate Tray 27, along with the Ion Exchange Membrane between the trays.

The Processor Chamber 11 of the present invention is completed by adding a pair of end caps to the top and bottom of the Cell Module 40. Specifically, as shown in FIGS. 2 and 3, a Top End Cap 46 mounts on the Anode Plate Tray 26 to cover the Anode Plate 31, and a Bottom End Cap 47 mounts on the Cathode Plate Tray 27 to cover the Cathode Plate 32. The Top End Cap may be referred to herein as the Anode End Cap, and the Bottom End Cap may be referred to herein as the Cathode End Cap. A preferred material for the end caps and the plate trays employed for the present invention is an "acetal" plastic, referred to as Polyoxymethylene or "POM," and also referred to conventionally as "polyacetal" or "polyformaldehyde." Acetal plastics are a thermoplastic polymer that are generally mill-able and moldable, and often specified by persons skilled in the manufacture of precision parts that require high stiffness, low friction and superior dimensional stability. There are two general types of acetal products available for both injection molding and machining; homopolymer and copolymer acetal plastics. A most preferred acetal plastic for manufacturing the end caps and plate trays in the Processor Chamber of the present invention is a copolymer type of acetal plastic, as supplied under the trade-names of CELCON™, manufactured by Ticona, or ULTRAFORM™, as manufactured by BASF. Copolymer acetal plastic is considered as offering better resistance to chlorine-containing solutions, including bleaches and strong alkalies, as compared to homopolymer acetal plastic.

The plate trays and end caps of the Processor Chamber 11 act as manifolds for routing the Source Water 100, through the Processor Chamber. The Inlet Header Manifold 210, as shown in FIG. 1, splits the Source Water into an Anodic Water 410 for processing within the Anodic Chamber 210, and a Cathodic Water 420 for processing within the Cathodic Chamber 220. The Anodic Water is received into an Anodic Inlet Port 51, and the Cathodic Water is received into a Cathodic Inlet Port 52 of the Top End Cap 46. As shown in FIG. 2, the Anodic Inlet Port and the Cathodic Inlet Port penetrate the Top End Cap, and provide for the Source Water 100 to enter the Processor Chamber 11.

From the Anodic Inlet Port 51 into the Processor Chamber 11, the Anodic Water 410 enters an Anodic Inlet Plenum 61, located immediately below the Anodic Inlet Port as shown in FIG. 2. The Anodic Inlet Plenum includes an Anodic Tray Cavity 66 and a Cathodic Tray Cavity 67. Similarly, from the Cathodic Inlet Port 52, the Cathodic Water 420 enters a Cathodic Inlet Plenum 62, located immediately below the Cathodic Inlet Port as also shown in FIG. 2. Like the Anodic Inlet Plenum, the Cathodic Inlet Plenum also includes an Anodic Tray Cavity and a Cathodic Tray Cavity. The Cathodic Tray Cavities and the Anodic Tray Cavities are framed regions within their respective Cathode Plate Tray 27 and Anode Plate Tray 26. When stacked together essentially in a sandwich, as shown in FIG. 3, the Anodic Tray Cavities and the Cathodic Tray Cavities align to form the plenum regions in the Processor Chamber 11, with one or a multiple of Cell Modules 40, with the aligned tray cavities acting as manifolds to route the processed water through the module, as needed.

In a preferable embodiment of the Processor Chamber 11, as shown in FIG. 2, the Anode Plate Tray 26 is mounted beneath the Top End Cap 46, sandwiching the Anode Plate 31 between the Top End Cap and the Anode Plate Tray. The Anode Plate is received within the Anode Plate Tray and separated from the Ion Exchange Membrane 25 by the Tray Grid 29 of the Anode Plate Tray. The Anodic Chamber 210 is bounded by the Ion Exchange Membrane 25 at the bottom and the Top End Cap at the top, with the Anode Plate Tray holding the Anode Plate sandwiched there between. To route the Anodic Water 410 into the Anodic Chamber, the Anode Plate Tray includes a set of Inlet Tray Ducts 63 that extend from the specific Anodic Tray Cavity below the Anodic Inlet Port 51, to the Anodic Inlet Plenum 61. The Inlet Tray Ducts are channels that are milled or otherwise formed into the Anode Plate Tray. A parallel set of three Inlet Tray Ducts are most preferred, engineered and dimensioned to provide for an adequate combined volume of flow from the Anodic Inlet Plenum 61. To complete the routing of the Anodic Water 410 into the Anodic Chamber, the Inlet Tray Ducts communicate with a similar set of Inlet Cap Ducts 64 in the Top End Cap. Like the Inlet Tray Ducts, the Inlet Cap Ducts are channels that are milled or otherwise formed into the Top End Cap. The Inlet Cap Ducts are most preferably oriented at a "right" or 90 degree angle relative to the Inlet Tray Ducts, and match-up end-to end with the Inlet Tray Ducts. A parallel set of three Inlet Cap Ducts are most preferred, engineered and dimensioned to provide for an adequate combined volume of flow into the Anodic Chamber.

Similarly, in a preferable embodiment of the Processor Chamber 11, as shown in FIG. 2, the Cathode Plate Tray 27 is mounted on top of the Bottom End Cap 47, sandwiching the Cathode Plate 32 between the Bottom End Cap and the Cathode Plate Tray. The Cathode Plate is received within the Cathode Plate Tray and separated from the Ion Exchange Membrane 25 by the Tray Grid 29 of the Cathode Plate Tray. The Cathodic Chamber 220 is bounded by the Ion Exchange Membrane 25 at the top and the Bottom End Cap at the bottom, with the Cathode Plate Tray holding the Cathode Plate sandwiched there between. To route the Cathodic Water 420 into the Cathodic Chamber, the Cathode Plate Tray includes a set of Inlet Tray Ducts 63 that extend from the specific Cathode Tray Cavity below the Cathode Inlet Port 52, to the Cathodic Inlet Plenum 62.

The Inlet Tray Ducts 63 are channels that are milled or otherwise formed into the Cathode Plate Tray 27. A parallel set of three Inlet Tray Ducts are most preferred, dimensioned to provide for an adequate combined volume of flow from the Cathodic Inlet Plenum 62. To complete the routing of the Cathodic Water 420 into the Cathodic Chamber 220, the Inlet Tray Ducts communicate with a similar set of Inlet Cap Ducts 64 in the Bottom End Cap 47. Like the Inlet Tray Ducts, the Inlet Cap Ducts are channels that are milled or otherwise formed into the Bottom End Cap. The Inlet Cap Ducts are most preferably oriented at a "right" or a 90 degree angle relative to the Inlet Tray Ducts, and match-up end-to end with the Inlet Tray Ducts. A parallel set of three Inlet Cap Ducts are most preferred, engineered and dimensioned to provide for an adequate combined volume of flow into the Cathodic Chamber.

Figure 4:
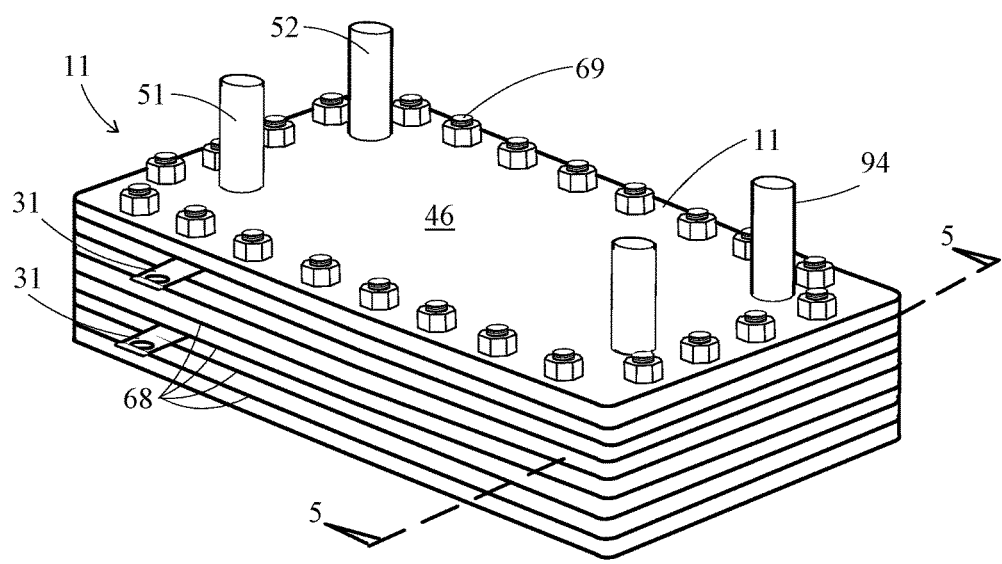
FIG. 4 is a perspective view of an electrolyzed water processor chamber having a modular manifold, according to an embodiment of the invention.
Figure 5:
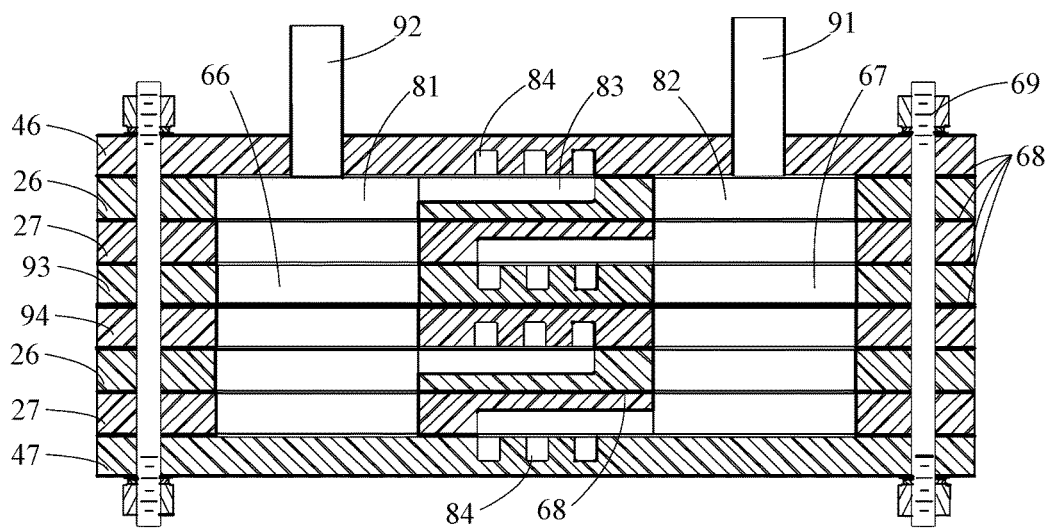
FIG. 5 is a sectioned view of an electrolyzed water processor chamber having a modular manifold, along the section plane 5-5 shown in FIG. 4, according to an embodiment of the invention.

Preferably, as shown in FIGS. 4 and 5, a gasket material 68 is inserted between the end caps and plate trays, to minimize leakage from the Processor Chamber 11. A most preferred gasket material is a food grade silicone material. However, alternate gasket material, or alternatively a sealant or glue could also be employed to function in sealing the Processor Chamber. Additionally, stainless steel bolt assemblies 69 with washers and nuts, are preferably employed to firmly hold the various trays, plates, membranes, caps and gaskets together. A plurality of Bolt Holes 70, as shown in FIGS. 2 through 4, are used to receive the bolt assemblies, as shown in FIGS. 4 and 5, to align, interconnect and hold the Processor Chamber together.

As discussed above, the Anodic Water 410 is routed into the Anodic Chamber 210, where the Anode Plate 31 is held within the Anodic Plate Tray 26, and the Cathodic Water 420 is similarly routed into Cathodic Chamber 220, where the Cathode Plate 32 is held within the Cathodic Plate Tray 26.

When electrically charged from an external electrical power source, the Anode Plate 31 and the Cathode Plate 32 serve to ionize the Source Water 100 within the Electrolytic Cell 200 of the Processor Chamber 11. The Anode acts to pull electrons from the Anodic Chamber 210 and the Cathode acts to pump electrons into the Cathodic Chamber 220. For the Processor Chamber 11 of the present invention, the Anode Plate and Cathode Plate are preferably a metallic material, selected to resist corrosion during the electrolyzing process. Most preferably, a constant current of approximately 25 to 50 amps at approximately 5 to 8 volts of DC power is connected to the arms of the electrode travels across the Anodic and Cathodic Plates within the Anodic and Cathodic chambers, respectively. The current flowing between the Plates reacts with the membrane, which then serves to promote an Ion Exchange 255 and form the Acid Ionized Water 480 as a product in the Anodic Chamber 210, and form the Alkaline Ionized Water 490 as a product in the Cathodic Chamber 220. The pH levels in the two distinct water products can be varied by adjusting the amperage flow across the Anodic and Cathodic Plates in the Processor Chamber 11. Generally, the higher the amperage of the current flow, the lower the pH level in the Acid Ionized Water, while the pH of the Alkaline Ionized Water increases with an increase in current flow.

Preferably, both the Anode Plate 31 and the Cathode Plate 32 are composed of a pure titanium metal, rather than an alloy. However, other metal electrode plates are known and could be substituted for the preferred Anode Plate and the Cathode Plate materials. Most preferably, a platinum electroplating is applied to both sides of the pure titanium electrode plates, to provide a catalytic surface for ionization reactions.

Water solvated ions within the Anodic Chamber 210 the Cathodic Chamber 220, as produced at their respectively charged plates, are able to transfer across the Ion Exchange Membrane 25, in the Ion Exchange 255 as shown in the general schematic of FIG. 1. Preferably, the Ion Exchange Membrane is a semipermeable barrier between the Anodic Chamber the Cathodic Chamber, as shown in FIG. 2, serving to segregate the ionization processes emanating at the Cathode from the ionization processes emanating at the Anode, while facilitating selective motion of certain charged ions, such as sodium.

The Ion Exchange Membrane 25 is selected to allow the desired permeability and ion selectivity, with low current transfer resistivity, while being substantially inert to degradation or fouling from the contents of the Anodic Chamber 210 and the Cathodic Chamber 220. Time in each chamber is a key processing variable, which is controlled by the incoming pressure of the Source Water into the Processor chamber 11, as constrained by the engineered design of the various ports, plenums, cavities, ducts and chambers, as described herein.

Additionally, the material of the Ion Exchange Membrane 25 is selected for temperature and chemical stability to achieve the longest possible operational life with good current efficiency, and a low voltage drop. A preferred Ion Exchange Membrane is NAFION® electrolysis membrane N-324, as manufactured by the DuPont Chemical Company of Delaware. This membrane has anode and cathode sides and can be described as a "perfluorosulonic acid cation exchange membrane," providing the needed physical strength and mechanical stability and resistance to gas blinding required for use in the present invention. Alternative membranes could include porous plastics, asbestos fibers and mineral or glass fibers, PTFE, paper, felt, fiber, polypropylene, PVC and asbestos on metal screens, copolymers, ceramics, styrene, aluminum, zircon or silicon oxides, as known in the field of ion exchange membranes.

From the Anodic Outlet Plenum 81, the Anodic Water 410 enters the Anodic Outlet Port 91, preferably located immediately above the Anodic Outlet Plenum as shown in FIG. 2. Essentially in a mirror construction of the Anodic Inlet Plenum 61, the Anodic Outlet Plenum includes the Anodic Tray Cavity 66 sandwiched atop the Cathodic Tray Cavity 67 on the diametrically opposite end of the Cell Module 40 from the Anodic Inlet Port 51. The Anodic Water is now fully processed and has been converted into the Acid Ionized Water 480, by the above described reactions within the Anodic Chamber 210 of the Electrolyzed Water Processor Chamber 11. The Acid Ionized Water is ready for use as needed, after exiting through the Anodic Outlet Port.

Anodic Water 410 flows from the Anodic Chamber 210 to the Anodic Outlet Port 91 through an Anodic Outlet Plenum 81, preferably located immediately below the Anodic Outlet Port as shown in FIG. 2. The Anodic Outlet Plenum includes the Anodic Tray Cavity 66 and Cathodic Tray Cavity 67. Similarly, to route the Cathodic Water 420 water to the Cathodic Outlet Port 92 from the Cathodic Chamber 210, the Cathodic Water then enters a Cathodic Outlet Plenum 82, located immediately below the Cathodic Outlet Port as also shown in FIG. 2. Like the Anodic Outlet Plenum, the Cathodic Outlet Plenum also includes an Anodic Tray Cavity and a Cathodic Tray Cavity. Again, the Cathodic Tray Cavities and the Anodic Tray Cavities are framed regions within their respective Cathode Plate Tray 27 and Anode Plate Tray 26. When stacked together essentially in a sandwich, as shown in FIG. 3, the Anodic Tray Cavities and the Cathodic Tray Cavities align to form the plenum regions in each Cell Module, acting as manifolds to route the processed water through the Processor Chamber 11, as needed.

To route the Anodic Water 410 from the Anodic Chamber 210 to the Anodic Outlet Port 91, the Anode Plate Tray 26 includes a set of Outlet Tray Ducts 83 that extend from the specific Anodic Tray Cavity 66 below the Anodic Outlet Port, to the Anodic Outlet Plenum 81, and onward to the Anodic Outlet Port. Similarly, to route the Cathodic Water 420 from the Cathodic Chamber 220 to the Cathodic Outlet Port 92, the Cathode Plate Tray 27 includes a set of the Outlet Tray Ducts extending from the specific Cathodic Tray Cavity 67 below the Cathodic Outlet Port, to the Cathodic Outlet Plenum 82, and onward to the Cathodic Outlet Port.

Again similar to the Inlet Tray Ducts 63 described above, the Outlet Tray Ducts 83 are also channels that are milled or otherwise formed into the Anode Plate Tray 26 or Cathode Plate Tray 27. A parallel set of three Outlet Tray Ducts are most preferred, engineered and dimensioned to provide for an adequate combined volume of flow into the respective Anodic Outlet Plenum 81 or Cathodic Outlet Plenum 82.

To complete the routing of the Anodic Water 410 out of the Anodic Chamber 210, the Outlet Tray Ducts 83 communicate with a set of similarly configured Outlet Cap Ducts 84 in the Top End Cap 46. Like the Outlet Tray Ducts, the Outlet Cap Ducts are channels that are milled or otherwise formed into the Top End Cap. The Outlet Cap Ducts are most preferably oriented at a "right" or 90 degree angle relative to the Outlet Tray Ducts, and the Outlet Cap Ducts match-up end-to end with the Outlet Tray Ducts. A parallel set of three Outlet Cap Ducts are most preferred, engineered and dimensioned to provide for an adequate combined volume of flow out of the Anodic Chamber and into the Anodic Outlet Plenum 81.

Similarly, the Cathodic Water 410 enters a Cathodic Outlet Port 92, after passing through the Cathodic Outlet Plenum 82. Preferably, the Cathodic Outlet Port is located immediately above the Cathodic Outlet Plenum as shown in FIG. 2. Essentially in a mirror construction of the Cathodic Inlet Plenum 62, the Cathodic Outlet Plenum includes the Anodic Tray Cavity 66 sandwiched atop the Cathodic Tray Cavity 67 on the diametrically opposite end of the Cell Module from the Cathodic Inlet Port 52. The Cathodic Water is now fully processed and converted into the Alkaline Ionized Water 490, by action within the Cathodic Chamber 220 of the Electrolyzed Water Processor Chamber 11. The Alkaline Ionized Water is ready for use as needed, after exiting through the Cathodic Outlet Port.

To aid in the completion of the routing of the Cathodic Water 420 out of the Cathodic Chamber 220, the Outlet Tray Ducts 83 communicate with a set of similarly configured Outlet Cap Ducts 84 in the Bottom End Cap 46, as shown in FIG. 2. Again, the Outlet Tray Ducts, like the Outlet Cap Ducts, are channels that are milled or otherwise formed into the Bottom End Cap. The Outlet Cap Ducts are most preferably oriented at a "right" or 90 degree angle relative to the Outlet Tray Ducts, and match-up end-to end with the Outlet Tray Ducts. A parallel set of three Outlet Cap Ducts are most preferred, engineered and dimensioned to provide for an adequate combined volume of flow out of the Cathodic Chamber and into the Cathodic Outlet Plenum 82.

According to additional embodiments of the present invention, as exemplified in FIG. 3 with two connected Cell Modules 40, one Processor Chamber 11 can include several of the Cell Modules, depending on the needed resultant flow of Acid Ionized Water 480 or of Alkaline Ionized Water 490. When more than one Cell Module is included between the Top End Cap 46 and Bottom End Cap 47, a Top Connector Tray 93 and a Bottom Connector Tray 94 can be utilized to combine several Cell Modules into one working Processor Chamber.

As detailed in FIG. 3, the two Cell Modules 40' and 40" are adjoined by a stacked pair of connector trays, specifically the Top Connector Tray 93 and the Bottom Connector Tray 94. Each connector tray includes a set of ducts, with both the Top Connector Tray and Bottom Connector Tray each having an Inlet Connecter Duct 96 and an Outlet Connector Duct 97. The connector ducts are similar to structure to the cap ducts described above, with the Inlet Connecter Duct functioning as the Inlet Cap Duct 64, and the Outlet Connector Duct functioning as the Outlet Cap Duct 84.

As also shown in FIG. 3, an Ion Exchange Membrane 25 is placed between the Top Connector Tray 93 and the Bottom Connector Tray 94, to form a Connector Module 99. With this preferred configuration, additional Cell Modules 40 can be placed on top of each other in a stack, with the Cathode Plate Tray 27 of an upper Cell Module 40' adjoined to the Anode Plate Tray 26 of a lower Cell Module 40", with a Connector Module between them, as shown in FIG. 3. However, any reasonable multiple of Cell Modules could be place in a stacked configuration, employing the Connector Modules.

Alternatively, with the Anode 310 and Cathode 320 reversed, the trays of the Cell Module 40 may be reversed likewise, with the Cathode Plate Tray 27 as the first tray beneath the Top End Cap 46, and the Anode Plate Tray 26 placed beneath the Cathode Plate Tray and above the Bottom End Cap 47.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. An electrolyzed water processor chamber comprising:
   an anodic chamber including an anode plate, and a cathodic chamber including a cathode plate, the anode plate and the cathode plate charged by an electrical current;
   an ion exchange membrane sandwiched between an anode plate tray and a cathode plate tray, the anode plate received into the anode plate tray and the cathode plate received into the cathode plate tray, and the ion exchange membrane placed between the anode plate tray and the cathode plate tray;
   an anode end cap mounted on the anode plate tray to cover the anode plate, and a cathode end cap mounted on the cathode plate tray to cover the cathode plate;
   a source water stream split into an anodic water and a cathodic water, the anodic water received into an anodic inlet port in the cathode end cap, and the cathodic source water received into a cathodic inlet port in the cathode end cap, and the anodic inlet port and the cathodic inlet port penetrate through the cathode end cap;
   the anodic water enters an anodic inlet plenum from the anodic inlet port, and the anodic inlet plenum includes a first cathodic tray cavity and a first anodic tray cavity;
   the cathodic water enters a cathodic inlet plenum from the cathodic inlet port, and the cathodic inlet plenum includes a second cathodic tray cavity and a second anodic tray cavity;
   the first cathodic tray cavity and the second cathodic tray cavity each framed within the cathode plate tray, and the first anodic tray cavity and second anodic tray cavity each framed within the anode plate tray; and
   the cathode plate tray and the anode plate tray stack together, the first cathodic tray cavity and first anodic tray cavity align to form the anodic inlet plenum, and the second cathodic tray cavity and the second anodic tray cavity align to form the cathodic inlet plenum.

2. The electrolyzed water processor chamber according to claim 1, wherein:

the anode plate is received on an opposite side of the anode plate tray relative to the ion exchange membrane, and the cathode plate is received on an opposite side of the cathode plate tray relative to the ion exchange membrane; and the anode plate tray includes an anode tray grid and the anode tray grid maintains a separation and prevent a contact between the anode plate and the ion exchange membrane, and the cathode plate tray includes a cathode tray grid and the cathode tray grid tray grid maintains a separation and prevent a contact between the cathode plate and the ion exchange membrane.

3. The electrolyzed water processor chamber according to claim 1, further comprising:

a cell module, the cell module assembled to include the anode plate within the anode plate tray, and the cathode plate within the cathode plate tray along with a first ion exchange membrane between the anode plate tray and the cathode anode plate tray;

a connector module, the connector module assembled to include a second ion exchange membrane sandwiched between a first connector tray and a second connector tray;

a multiple of the cell modules stacked together to form a multi-cell chamber, with each of the multiple of the cell modules inter connected with a connector module, and the cathode plate tray exposed at a top end of the multi-cell chamber is a top-most cathode plate tray, and the anode plate tray exposed at a bottom end of the multi-cell chamber is a bottom-most anode plate tray; and the cathode end cap mounts on the top-most anode plate tray to cover the anode plate, and the anode end cap mounts on the bottom-most cathode plate tray.

4. The electrolyzed water processor chamber according to claim 1, further comprising:

an acid ionized water produced from an anodic outlet port in the cathode end cap;

an alkaline ionized water produced from a cathodic outlet port in the cathode end cap, and the anodic outlet port and the cathodic outlet port penetrate through the cathode end cap;

the anodic outlet port the anodic water enters an anodic outlet plenum;

the anodic outlet plenum includes a third anodic tray cavity and a third cathodic tray cavity, and from the cathodic outlet port, the cathodic water enters a cathodic outlet plenum;

the cathodic outlet plenum includes a fourth anodic tray cavity and a fourth cathodic tray cavity;

the third cathodic tray cavity and the fourth cathodic tray cavity each framed within the cathode plate tray, and the third anodic tray cavity and fourth anodic tray cavity each framed within the anode plate tray; and the anode plate tray and the cathode plate tray stack together, the second anodic tray cavity and second cathodic tray cavity align to form the anodic outlet plenum, and the fourth anodic tray cavity and the fourth cathodic tray cavity align to form the cathodic outlet plenum.

5. The electrolyzed water processor chamber according to claim 1, further comprising:

an inlet duct that includes an inlet tray duct combined with an inlet cap duct;

the inlet tray duct includes a plurality of tray channels formed into the anode plate tray, and the inlet tray duct extends from the first anodic tray cavity to the inlet cap duct;

the inlet cap duct includes a plurality of cap channels formed into the top end cap, and the inlet cap duct extends from the inlet tray duct to the anodic chamber; and with the cathode end cap mounted to the cathodic plate tray, the inlet tray duct connects to the inlet cap duct, to route the anodic water from the anodic inlet plenum into the anodic chamber.

6. The electrolyzed water processor chamber according to claim 1, further comprising:

an inlet duct that includes an inlet tray duct combined with an inlet cap duct;

the inlet tray duct includes a plurality of tray channels formed into the cathode plate tray, and the inlet tray duct extends from the second cathodic tray cavity to the inlet cap duct;

the inlet cap duct includes a plurality of cap channels formed into the anode end cap, and the inlet cap duct extends from the inlet tray duct to the cathodic chamber; and with the anode end cap mounted to the anode plate tray, the inlet tray duct connects to the inlet cap duct, to route the cathodic water from the cathodic inlet plenum into the cathodic chamber.

7. The electrolyzed water processor chamber according to claim 1, further comprising:

an outlet duct that includes an outlet tray duct combined with an outlet cap duct;

the outlet tray duct includes a plurality of tray channels formed into the anode plate tray, and the outlet tray duct extends from the third anodic tray cavity to the outlet cap duct;

the outlet cap duct includes a plurality of cap channels formed into the anode end cap, and the outlet cap duct extends from the outlet tray duct to the anodic chamber; and with the anode end cap mounted to the anodic plate tray, the outlet tray duct connects to the outlet cap duct, to route the anodic water from the anodic chamber into the anodic outlet plenum.

8. The electrolyzed water processor chamber according to claim 1, further comprising:

an outlet duct that includes an outlet tray duct combined with an outlet cap duct;

the outlet tray duct includes a plurality of tray channels formed into the cathode plate tray, and the outlet tray duct extends from the fourth cathodic tray cavity to the outlet cap duct;

the outlet cap duct includes a plurality of cap channels formed into the cathode end cap, and the outlet cap duct extends from the outlet tray duct to the cathodic chamber; and with the cathode end cap mounted to the cathodic plate tray, the outlet tray duct connects to the outlet cap duct, to route the cathodic water from the cathodic chamber into the cathodic outlet plenum.

* * * * *